US012598674B2

(12) United States Patent
Neilson et al.

(10) Patent No.: US 12,598,674 B2
(45) Date of Patent: *Apr. 7, 2026

(54) HEATING ELEMENT UNIT

(71) Applicant: Chromalox, Inc., Pittsburgh, PA (US)

(72) Inventors: Paul Neilson, Pittsburgh, PA (US); Danen Lynn, Pittsburgh, PA (US); Martin Konieczny, Pittsburgh, PA (US)

(73) Assignee: Chromalox, Inc., Pittsburgh, PA (US)

( * ) Notice: Subject to any disclaimer, the term of this patent is extended or adjusted under 35 U.S.C. 154(b) by 1093 days.

This patent is subject to a terminal disclaimer.

(21) Appl. No.: 17/571,772

(22) Filed: Jan. 10, 2022

(65) Prior Publication Data

US 2022/0141924 A1 May 5, 2022

(51) Int. Cl.

| | |
|---|---|
| ***H05B 3/06*** | (2006.01) |
| ***H01B 3/10*** | (2006.01) |
| ***H05B 3/44*** | (2006.01) |

(52) U.S. Cl.

CPC ................. *H05B 3/06* (2013.01); *H01B 3/10* (2013.01); *H05B 3/44* (2013.01)

(58) Field of Classification Search

CPC ............... H05B 3/06; H05B 3/44; H01B 3/10

See application file for complete search history.

(56) References Cited

U.S. PATENT DOCUMENTS 3,571,477 A * 3/1971 Phillips .................... H05B 3/64 373/110
3,805,024 A * 4/1974 Joeckel ................ H05B 3/0038 219/544
5,034,595 A * 7/1991 Grendys .................. H05B 3/48 219/544
8,426,779 B2 4/2013 Schlipf
12,245,338 B2 * 3/2025 Chen ......................... H05B 3/16
2003/0042241 A1 * 3/2003 Uekawa ............... H05B 3/0095 219/469

(Continued)

FOREIGN PATENT DOCUMENTS

EP 2221834 A1 8/2010
FR 2754128 A1 * 4/1998 ............... H05B 3/48
FR 3028708 A3 5/2016

OTHER PUBLICATIONS

FR 2754128 A1—translate (Year: 2025).*

(Continued)

*Primary Examiner* — Elizabeth M Kerr
*Assistant Examiner* — Keith Brian Assante
(74) *Attorney, Agent, or Firm* — Faegre Drinker Biddle & Reath LLP

(57) ABSTRACT

A heating element unit for an electric resistance heater comprises: a casing; a heating element within the casing; and an electrical insulator between the heating element and the casing. In some embodiments, the electrical insulator comprises first and second layers, the second layer having a greater dielectric strength than the first layer, and the second layer having: a dielectric strength of greater than about 1500 kV/m (greater than about 40 V/mil). In some embodiments, the electrical insulator comprises an electrically-insulating granular material and has a dielectric strength greater than about 1500 kV/m (greater than about 40 V/mil).

10 Claims, 4 Drawing Sheets

(56) References Cited

U.S. PATENT DOCUMENTS

Figures 1A, 1B, 1C:
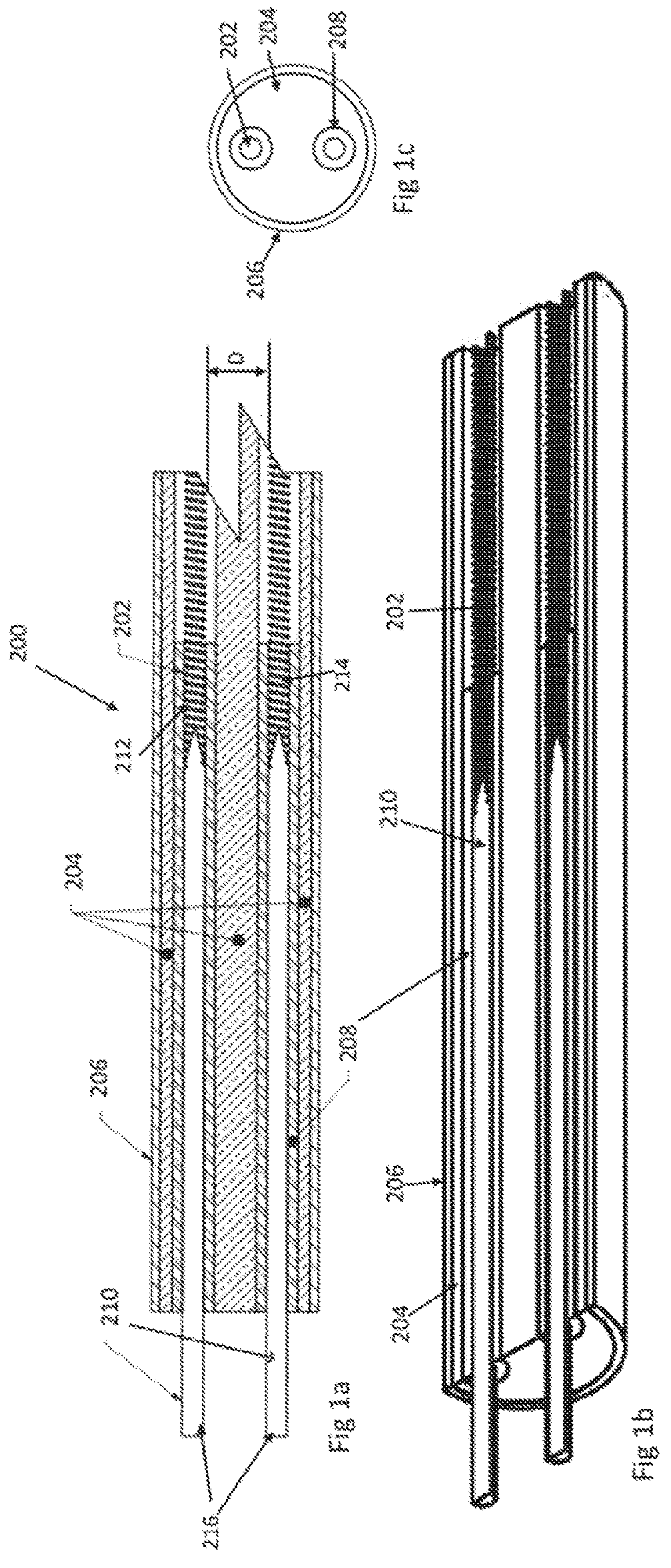

| | | | | |
|---|---|---|---|---|
| 2005/0115958 | A1* | 6/2005 | Hoh | H05B 6/1263 219/620 |
| 2007/0023418 | A1 | 2/2007 | Schlipf | |
| 2015/0285033 | A1* | 10/2015 | Noel | H05B 3/56 392/301 |
| 2020/0249098 | A1* | 8/2020 | Zoppas | G01K 7/16 |
| 2021/0136876 | A1 | 5/2021 | Dinauer et al. | |
| 2023/0213239 | A1* | 7/2023 | Ekström | H05B 3/12 392/478 |
| 2023/0225015 | A1 | 7/2023 | Sillito et al. | |

OTHER PUBLICATIONS

European Search Report; European Patent Office; European Application No. 23150809.4-1202 / 4221461; Oct. 12, 2023; 9 pages.
Extended European Search Report dated Jun. 6, 2023 issued in EP 23150811.0 (8 pages).
Office Action mailed Mar. 27, 2025 for U.S. Appl. No. 17/571,768 with double-patenting rejections on pp. 3-10.

* cited by examiner 202
204
208
206

D
200
202
212
214
204
206
208
210
216

202
210
208
206
204

HEATING ELEMENT UNIT

TECHNICAL FIELD

The present disclosure relates to heating element units, suitable for use in electrical resistance heaters, methods of manufacturing heating element units, and uses of electrically insulating materials in heating element units.

BACKGROUND

A typical electrical resistance heater comprises a heating element (e.g. a wire) with high electrical resistivity which is surrounded by a heat conducting dielectric material, enclosed within a casing. As an electrical current is passed through the heating element, heat is generated. The surrounding dielectric material transfers the heat to the casing and to the surroundings, thereby providing a heating effect. Magnesium oxide (MgO) is commonly used as the heat conducting dielectric material in electrical resistance heaters. However, existing electrical resistance heaters may not be suitable for use in higher-voltage applications. It may therefore be desirable to provide an improved arrangement.

SUMMARY

According to a first aspect, there is provided a heating element unit for an electric resistance heater, the heating element unit comprising:

a casing;

a heating element within the casing; and an electrical insulator between the heating element and the casing;

wherein the electrical insulator comprises first and second layers, the second layer having a greater dielectric strength than the first layer, and the second layer having:

a dielectric strength of greater than about 1500 kV/m (about 40 V/mil).

According to a second aspect, there is provided a heating element unit for an electric resistance heater, the heating element unit comprising:

a casing;

a heating element within the casing; and an electrical insulator between the heating element and the casing;

wherein the electrical insulator comprises an electrically-insulating granular material and has a dielectric strength greater than about 1500 kV/m (40 V/mil).

According to a third aspect, there is provided a method of manufacturing a heating element unit according to the first or second aspects, the method comprising: providing the heating element within the casing; and providing the electrical insulator between the heating element and the casing.

According to a fourth aspect, there is provided a use of one or more of the following in an electrical insulator provided between a heating element and a casing of a heating element unit for an electric resistance heater: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

According to a fifth aspect, there is provided an electric resistance heater comprising a heating element unit according to the first or second aspects.

The details, examples and preferences provided in relation to any particular one or more of the stated aspects will be further described herein and apply equally, mutatis mutandis, to all aspects. Any combination of the embodiments, examples and preferences described herein in all possible variations thereof is encompassed by the present disclosure unless otherwise indicated herein, or otherwise clearly contradicted by context.

The present invention is based on the surprising and advantageous finding that by incorporating a material having a dielectric strength greater than about 1500 kV/m (about 40 V/mil) as an electrical insulator in a heating element unit, the heating element unit may be operated at higher voltages without a concomitant increase in size of the heating element unit, or the size of a heating element unit may be reduced without a concomitant reduction in the operating voltage. The material having a dielectric strength greater than about 1500 kV/m (about 40 V/mil) may be incorporated into the heating element unit as an additional layer within the unit, such as in a sleeve or coating, or may be provided in the form of a granular material.

Heating Element Unit

There is provided herein a heating element unit comprising: a casing; a heating element within the casing; and an electrical insulator between the heating element and the casing. The electrical insulator may comprise first and second layers, the second layer having a greater dielectric strength than the first layer, and the second layer having a dielectric strength of greater than about 1500 kV/m (about 40 V/mil). Additionally or alternatively, the electrical insulator may comprise an electrically-insulating granular material and may have a dielectric strength greater than about 1500 kV/m (greater than about 40 V/mil).

The heating element may be a coil. The heating element may comprise (e.g. be) a wire. The heating element may comprise (e.g. be) a strip of wire. The heating element may comprise (e.g. be) a ribbon, for example, a straight or corrugated ribbon. The heating element may comprise (e.g. be) a coil. The coil may be formed from the wire, strip of wire, or the ribbon, i.e. the wire, strip of wire or the ribbon may be coiled.

The heating element may have a high electrical resistivity. The heating element may have an electrical resistivity no less than about 0.90 $\Omega mm^2/m$ (540 Ω/cmf) and no greater than about 1.60 $\Omega mm^2/m$ (960 Ω/cmf). The heating element may have an electrical resistivity no less than about 1.00 $\Omega mm^2/m$ (600 Ω/cmf) and no greater than about 1.50 $\Omega mm^2/m$ (900 Ω/cmf). The heating element may have an electrical resistivity no less than about 1.00 $\Omega mm^2/m$ (600 Ω/cmf) and no greater than about 1.20 $\Omega mm^2/m$ (720 Ω/cmf).

The heating element may be formed from a metal or metal alloy such as a nickel-chromium (NiCr) alloy. The heating element may be formed from Nikrothal® 80, available from Kanthal AB, Sweden. The heating element may have an electrical resistivity of about 1.09 $\Omega mm^2/m$ (654 Ω/cmf).

The heating element may extend along a length of the heating element unit (i.e. within the casing). The heating element may extend along substantially the majority of the length of the heating element unit. The heating element may extend along the entire length of the heating element unit.

The heating element (e.g. the wire, strip of wire, ribbon or coil) may extend in a substantially straight line through the casing. The heating element (e.g. the wire, strip of wire, ribbon or coil) may be bent within the casing. The heating element (e.g. the wire, strip of wire, ribbon or coil) may follow a curved path within the casing. For example, the heating element (e.g. the wire, strip of wire, ribbon or coil) may bend through 180° within the casing so that two substantially parallel heating element sections are formed within the casing. That is to say, the heating element (e.g. the wire, strip of wire, ribbon or coil) may traverse the (e.g. majority of the) length of the heating element unit twice. The heating element (e.g. the wire, strip of wire, ribbon or coil) may comprise more than two such substantially parallel heating element sections. That is to say, the heating element (e.g. the wire, strip of wire, ribbon or coil) may traverse the (e.g. majority of the) length of the heating element unit more than two times.

The heating element may be spaced apart from the casing, i.e. such that the heating element does not make electrical contact with the casing. The heating element may be spaced apart from the casing by the electrical insulator. The heating element may be spaced apart from the casing by the electrical insulator in more than one location. The heating element may be surrounded by the electrical insulator. The heating element may be completely surrounded by the electrical insulator. The electrical insulator may extend along substantially the entire length of heating element unit and/or the heating element.

The electrical insulator may be both electrically insulating and heat conducting. The electrical insulator may be a dielectric material. The electrical insulator may be surrounded by the casing. As a current is passed through the heating element, heat may be generated.

The surrounding electrical insulator may transfer heat from the heating element to the casing (and thus to the surroundings), thereby providing a heating effect.

The electrical insulator may have a higher electrical resistance than the heating element.

The casing may be a sheath. The casing may be metallic (i.e. formed from a metal or metal alloy). The casing may be tubular.

The heating element unit may include at least one electrical supply pin. The at least one electrical supply pin may supply current to the heating element. The electrical supply pin may have terminal ends for connection to a device and/or electrical wiring. The heating element unit may include at least first and second electrical supply pins, the first electrical supply pin being in electrical contact with a first end of the heating element and the second electrical supply pin being in electrical contact with a second, opposing end of the heating element. The first and second ends of the heating element, and thus the first and second electrical supply pins, may be located at opposing ends of the heating element unit (e.g. opposing ends of the casing). Alternatively, for example in embodiments in which the heating element is bent within the casing, the first and second ends of the heating element, and thus the first and second electrical supply pins, may be located at the same end of the heating element unit (e.g. the same end of the casing). The electrical insulator may surround at least a portion of the at least one electrical supply pin or at least a portion of each of the first and second electrical supply pins.

The heating element unit may be provided in an electric resistance heater, wherein the electrical supply pins of the heating element unit are connected to a power supply.

Electrical Insulator

The electrical insulator may have a dielectric strength greater than about 1500 kV/m (about 40 V/mil).

In some embodiments, the electrical insulator comprises first and second layers, the second layer having a greater dielectric strength than the first layer, and the second layer having a dielectric strength of greater than about 1500 kV/m (about 40 V/mil).

The second layer may have a dielectric strength no less than about 1501 kV/m, for example, no less than about 2000 kV/m, or no less than about 3000 kV/m, or no less than about 4000 kV/m, or no less than about 5000 kV/m, or no less than about 6000 kV/m, or no less than about 7000 kV/m, or no less than about 7800 kV/m, or no less than about 10000 kV/m, or no less than about 15000 kV/m, or no less than about 20000 kV/m, or no less than about 23000 kV/m.

The second layer may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The second layer may have a dielectric strength greater than about 1500 kV/m (e.g. no less than about 1501 kV/m) and no greater than about 1000000 kV/m, for example, greater than about 1500 kV/m (e.g. no less than about 1501 kV/m) and no greater than about 500000 kV/m, or greater than about 1500 kV/m (e.g. no less than about 1501 kV/m) and no greater than about 250000 kV/m, or greater than about 1500 kV/m (e.g. no less than about 1501 kV/m) and no greater than about 100000 kV/m, or greater than about 1500 kV/m (e.g. no less than about 1501 kV/m) and no greater than about 50000 kV/m, or greater than about 1500 kV/m (e.g. no less than about 1501 kV/m) and no greater than about 40000 kV/m, or greater than about 1500 kV/m (e.g. no less than about 1501 kV/m) and no greater than about 39000 kV/m, for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The second layer may have a dielectric strength no less than about 6000 kV/m and no greater than about 1000000 kV/m, for example, no less than about 6000 kV/m and no greater than about 500000 kV/m, or no less than about 6000 kV/m and no greater than about 250000 kV/m, or no less than about 6000 kV/m and no greater than about 100000 kV/m, or no less than about 6000 kV/m and no greater than about 50000 kV/m, or no less than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The second layer may have a dielectric strength no less than about 7800 kV/m and no greater than about 10000000 kV/m, for example, no less than about 7800 kV/m and no greater than about 500000 kV/m, or no less than about 7800 kV/m and no greater than about 250000 kV/m, or no less than about 7800 kV/m and no greater than about 1000000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The second layer may have a dielectric strength no less than about 15000 kV/m and no greater than about 10000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

It will be understood that the term "dielectric strength" (otherwise known as the "dielectric breakdown strength") is measured as the voltage required to produce a dielectric breakdown through an electrically insulating material, i.e. the voltage at which the material loses its electrically insulating properties and current is able to flow. The dielectric strength can be determined for a certain piece of material and electrode separation, as the minimum applied electric field that results in dielectric breakdown (i.e. the applied voltage divided by electrode separation distance). Dielectric strength is measured in units of V/m (or equivalents thereof).

Unless stated otherwise, references to dielectric strength of a material in the present specification and claims are references to dielectric strength as measured according to ASTM D149 or IEC 60243 at an ambient temperature (i.e. 25° C. (77° F.)).

The dielectric strength of an electrical insulator within the heating element unit can also be assessed using a dielectric withstand test, for example, using a HiPot tester such as the 3500D, 5500DT, 7550DT or 7620 HiPot testers available from Associated Research, Inc, USA. One lead of the tester is connected to the heating element and the other lead of the tester is connected to the casing. An AC voltage is then applied between the heating element and the casing for a fixed period of time and the current is measured. Dielectric withstand testing is typically carried out as a pass/fail test, where the AC voltage applied is calculated based on the voltage rating of the heating element unit and the time for which the test is to be carried out. A heating element unit will fail the test when the current detected is greater than a predetermined threshold value.

Dielectric withstand testing is commonly carried out for 1 second or for 1 minute. A heating element unit having a rated voltage of 120 V is tested at 1200 V (for the 1 second test) and 1000 V (for the 1 minute test), whereas a heating element unit having a rated voltage of 480 V is tested at 2352 V (for the 1 second test) and 1960 V (for the 1 minute test).

Failure may be caused by reduced heating element—casing clearance, an off-centred heating element, contamination, poor repress, gaps or cavities, or reduced dielectric strength of the electrical insulator. Therefore, assuming that other factors are controlled for, the withstand test can be used to estimate the dielectric strength of the electrical insulator, for example, by ramping up the applied voltage until breakdown occurs. Withstand testing is generally carried out at room temperature.

The second layer may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

It will be appreciated that the term "metal oxide" encompasses oxides of a single metal element (e.g. MgO) as well as oxides of two or more different metal elements (e.g. NiWO), including doped oxides or oxides having non-stochiometric compositions.

The term "alkaline earth metal oxide" refers to oxides including one or more alkaline earth metal elements. The alkaline earth metal elements include beryllium (Be), magnesium MgO), calcium (Ca), strontium (Sr), barium (Ba) and radium (Ra).

The term "transition metal oxide" refers to oxides including one or more transition metal elements. The transition metal elements include scandium (Sc), titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (VV), rhenium (Re), osmium (Os), iridium (Ir), platinum (Pt) and gold (Au).

The term "post transition metal oxide" refers to oxides including one or more post transition metal elements. The post transition metal elements include zinc (Zn), cadmium (Cd), mercury (Hg), aluminium (Al), gallium (Ga), indium (In), thalium (Tl), tin (Sn), lead (Pb), bismuth (Bi), germanium (Ge), antimony (Sb) and polonium (Po).

The term "Group 13 nitride" refers to a nitride of an element in Group 13 of the periodic table of elements, which includes boron (B), aluminium (Al), gallium (Ga), indium (In) and thallium (Tl).

The term "Group 14 nitride" refers to a nitride of an element in Group 14 of the periodic table of elements, which includes carbon (C), silicon (Si), germanium (Ge), tin (Sn) and lead (Pb).

The term "silicate mineral" refers to minerals comprising ionic compounds whose anions consist essentially of silicon and oxygen atoms, for example, in the form of orthosilicates, metasilicates or pyrosillicates. The silicate minerals include nesosilicate minerals, sorosilicate minerals, cyclosilicate minerals, inosilicate minerals, phyllosilicate minerals and tectosilicate minerals. For the purposes of this specification and claims, the silicate minerals also include silica ($SiO_2$), as is common in the field of mineralogy.

The term "aluminium silicate" refers to minerals composed of aluminium, silicon and oxygen, which are derived from aluminium oxide ($Al_2O_3$) and silicon dioxide (SiO) and which may be anhydrous or hydrated, naturally-occurring or synthetic. Their chemical formulae may be expressed as $xAl_2O_3.ySiO_2.zH_2O$.

The term "aluminosilicate mineral" refers to minerals composed of aluminium, silicon and oxygen, plus optional countercations, and may be anhydrous or hydrated. The aluminosilicate minerals include andalusite, kyanite, sillimanite, kaolinite, metakaolinite and mullite.

The term "phyllosilicate mineral" refers to silicate minerals which include parallel sheets of silicate tetrahedra with $Si_2O_5$ in a 2:5 ratio. The phyllosilicate minerals include the serpentine group minerals, the clay group minerals and the mica group minerals (i.e. "mica"). The mica group minerals include biotite, fuchsite, muscovite, phlogopite, lepidolite, margarite and glauconite.

The term "glass" refers to a non-crystalline, amorphous material, typically formed by rapid cooling of a melt, which may be synthetic or natural occurring. Glasses include silicate glasses which are formed predominantly from $SiO_2$. Silicate glasses include soda-lime glass (silicate glass including sodium carbonate ($Na_2CO_3$) and lime (CaO), typically also magnesium oxide (MgO) and aluminium oxide ($Al_2O_3$)), borosilicate glass (silicate glass including boron trioxide ($B_2O_3$) and aluminosilicate glass (silicate glass including alumina ($Al_2O_3$)).

The term "ceramic" refers to inorganic, non-metallic materials comprising metal, non-metal or metalloid atoms primarily held in ionic and covalent bonds. Ceramics are commonly based on oxides, nitrides, borides or carbides.

The term "glass ceramic" refers to materials containing both non-crystalline glass and crystalline ceramic phases, typically formed by controlled nucleation and partial crystallisation of a base glass through heat treatment. Glass ceramics may be based on the LAS ($Li_2O \times Al_2O_3 \times nSiO_2$), MAS ($MgO \times Al_2O_3 \times nSiO_2$) or ZAS ($ZnO \times Al_2O_3 \times nSiO_2$) systems. Glass ceramics include machinable glass ceramics, which are glass ceramics having suitable mechanical properties for machining, such as Macor® available from Corning Inc., USA.

The term "polymer" encompasses synthetic and natural polymers made from any suitable monomers, and includes fluoropolymers (i.e. polymers made from fluorocarbon monomers) such as PTFE and silicones (i.e. polymerised siloxanes) such as silicone rubber.

The term "mineral" as used herein encompasses both naturally-occurring minerals and synthetic mineral-like products.

The second layer may comprise (e.g. be formed from, consist of or consist essentially of) one or more of: a metal oxide such as an alkaline earth metal oxide, for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate mineral such as mullite; or a glass ceramic such as a machinable glass ceramic. These materials may have a dielectric strength no less than about 7800 kV/m and no greater than about 39000 kV/m.

The second layer may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic. These materials may have a dielectric strength no less than about 15000 kV/m and no greater than about 39000 kV/m.

The second layer may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic. These materials may have a dielectric strength no less than about 23000 kV/m and no greater than about 39000 kV/m.

The second layer may comprise (e.g. be formed from, consist of or consist essentially of) one or more materials having a melting point no less than about 1000° C., for example, no less than about 2000° C., or no less than about 3000° C. For example, the second layer may have a melting point no less than about 1000° C., for example, no less than about 2000° C., or no less than about 3000° C.

It will be understood that the term "melting point" refers to the temperature at which a substance changes from a solid to a liquid. The term "melting point" as used in the present specification and claims refers to the melting point as measured at atmospheric pressure. It will be appreciated that some substances (e.g. chemical mixtures) melt across a range of temperatures between a solidus temperature, below which the substance is completely solid, and a liquidus temperature, above which the substance is completely liquid. For such substances, references to "melting point" herein shall be interpreted as references to the solidus temperature, i.e. the temperature at which melting of the substance begins.

The second layer may comprise (e.g. be formed from, consist of or consist essentially of) one or more of: a metal oxide such as an alkaline earth metal oxide, for example, magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite. These materials may have a melting point no less than about 1000° C.

The second layer may comprise (e.g. be formed from, consist of or consist essentially of) one or more of: a metal oxide such as an alkaline earth metal oxide, for example, magnesium oxide (MgO), a transition metal oxide, for example, zirconium dioxide ($ZrO_2$), or hafnium dioxide ($HfO_2$), or a post transition metal oxide, for example, aluminium oxide ($Al2O_3$); or a nitride such as a Group 13 nitride, for example, boron nitride (BN) or aluminium nitride (AlN). These materials may have a melting point no less than about 2000° C.

The second layer may comprise (e.g. be formed from, consist of or consist essentially of) a nitride such as a Group 13 nitride, for example, boron nitride (BN). This material may have a melting point no less than about 3000° C.

The second layer may comprise (e.g. be formed from, consist of or consist essentially of) one or more materials having a thermal conductivity no less than about 3 W/mK, for example, no less than about 10 W/mK, or no less than about 100 W/mK. For example, the second layer may have a thermal conductivity no less than about 3 W/mK, for example, no less than about 10 W/mK, or no less than about 100 W/mK.

It will be understood that the term "thermal conductivity" is the ability of a material to conduct heat, and it represents the quantity of thermal energy that flows per unit time through a unit area with a temperature gradient of 1° per unit distance, for example, measured according to ASTM C177 or C518.

The second layer may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite. These materials may have a thermal conductivity no less than about 3 W/mK.

The second layer may comprise (e.g. be formed from, consist of or consist essentially of) one or more of: a metal oxide such as an alkaline earth metal oxide, for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN). These materials may have a thermal conductivity no less than about 10 W/mK.

The second layer may comprise (e.g. be formed from, consist of or consist essentially of) one or more of: a metal oxide such as an alkaline earth metal oxide, for example, beryllium oxide (BeO) or a nitride such as a Group 13 nitride, for example, aluminium nitride (AlN). These materials may have a thermal conductivity no less than about 100 W/mK.

The second layer may comprise (e.g. be formed from, consist of or consist essentially of) one or more materials having an electrical resistivity no less than about 100000 MΩm, for example, no less than about 1000000 MΩm, or no less than about 2000000 MΩm. For example, the second layer may have an electrical resistivity no less than about 100000 MΩm, for example, no less than about 1000000 MΩm, or no less than about 2000000 MΩm.

It will be understood that the term "electrical resistivity" (also referred to as "specific electrical resistance" or "volume resistivity") is a fundamental property of a material that measures how strongly it resists electric current. Electrical resistivity may be determined by measuring the electrical resistance, for example using an ohmmeter, according to ASTM D257.

The second layer may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide (Al2O3); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 100000 MΩm.

The second layer may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 1000000 MΩm.

The second layer may comprise (e.g. be formed from, consist of or consist essentially of) one or more of: a metal oxide such as an alkaline earth metal oxide, for example, magnesium oxide (MgO), a transition metal oxide, for example, hafnium dioxide ($HfO_2$); or a nitride such as a Group 13 nitride, for example, boron nitride (BN). These materials may have an electrical resistivity no less than about 2000000 MΩm.

The first layer may comprise (e.g. be formed from, consist of or consist essentially of) one or more of: a metal oxide such as an alkaline earth metal oxide, for example, magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite.

The first layer may have a dielectric strength of no greater than about 1500 kV/m (40 V/mil). A compacted granular magnesium oxide may have a dielectric strength of about 1500 kV/m (40 V/mil). The first layer may have a dielectric strength of no greater than about 2900 kV/m (75 V/mil). A preformed and compressed granular magnesium oxide may have a dielectric strength of about 2900 kV/m (75 V/mil). The first layer may have a dielectric strength of no greater than about 5900 kV/m (150 V/mil). The first layer may have a dielectric strength of no greater than about 9800 kV/m (250 V/mil). A solid (i.e. non-granular) magnesium oxide may have a dielectric strength of no greater than about 5900 kV/m (150 V/mil), or no greater than about 9800 kV/m (250 V/mil).

It may be that the first layer comprises (e.g. is formed from, consists of or consists essentially of) magnesium oxide (MgO) and the second layer has a dielectric strength greater than the dielectric strength of magnesium oxide (MgO). It may be the first layer consists essentially of magnesium oxide (MgO) and the second layer has a dielectric strength greater than the dielectric strength of magnesium oxide (MgO), for example, wherein the second layer comprises (e.g. is formed from, consists of or consists essentially of) one or more materials having a dielectric strength greater than the dielectric strength of magnesium oxide (MgO).

The first layer may be an inner layer and the second layer may be an outer layer. The inner layer may be arranged closer to the heating element than the outer layer. The inner layer may be arranged radially inwards of the outer layer. The inner layer may surround the heating element. The outer layer may surround the inner layer. The second layer may be a barrier. The first layer may be an outer layer and the second layer may be an inner layer.

It may be that: the first layer is an inner layer which surrounds the heating element, said inner layer comprising (e.g. being formed from, consisting of or consisting essentially of) magnesium oxide (MgO); and the second layer is an outer layer which surrounds the inner layer, said outer layer comprising (e.g. being formed from, consisting of or consisting essentially of) one or more materials having a dielectric strength greater than the dielectric strength of magnesium oxide (MgO).

It may be that: the first layer is an inner layer which surrounds the heating element, said inner layer comprising (e.g. being formed from, consisting of or consisting essentially of) magnesium oxide (MgO); and the second layer is an outer layer which surrounds the inner layer, said outer layer comprising (e.g. being formed from, consisting of or consisting essentially of) a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$), a nitride such as a Group 13 nitride, for example, boron nitride (BN) or aluminium nitride (AlN), or a Group 14 nitride, for example, silicon nitride (SiN), a silicate, aluminium silicate, aluminosilicate or phyllosilicate mineral such as mullite or mica, a glass such as soda-lime glass, borosilicate glass or aluminosilicate glass, a ceramic, a glass ceramic such as a machinable glass ceramic, and/or a polymer such a fluoropolymer, for example, polytetrafluoroethylene (PTFE), or a silicone.

The second layer may be a sleeve, for example, a preformed sleeve.

The sleeve may be preformed into shape. During manufacture of the heating element unit, the sleeve may be applied to, for example, placed around, the heating element, for example the pin, coil, wire or ribbon. The sleeve may be applied to, for example, placed adjacent the casing (e.g. sheath), for example on an internal side of the casing (e.g. sheath).

The sleeve may comprise one or more of: a silicate, aluminium silicate, aluminosilicate or phyllosilicate mineral such as mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone. The sleeve may comprise a polymeric material.

The second layer may be a coating. The coating may be a coating on the heating element, for example on a coil, wire or ribbon. The coating may be a coating on the casing (e.g. sheath). For example, the coating may be a coating on an internal side of the casing (e.g. sheath), such as the side of the casing (e.g. sheath) which is closest to the heating element. The coating may be applied by spraying or painting.

The coating may be a ceramic-based coating or a polymer-based coating such as an epoxy resin, thermoplastic or thermoset polymer, a silicone-based coating or a fluoropolymer-based coating. The ceramic-based coating may be formed from a commercially available coating material such as from the Cerakote®, Duracote® or Aluma-Hyde® or CeraGlide® product ranges.

The electrical insulator may comprise no more than about 10 wt. % of the first layer and no less than about 90 wt. % of the second layer. The electrical insulator may comprise no more than about 20 wt. % of the first layer and no less than about 80 wt. % of the second layer. The electrical insulator may comprise no more than about 30 wt. % of the first layer and no less than about 70 wt. % of the second layer. The electrical insulator may comprise no more than about 40 wt. % of the first layer and no less than about 60 wt. % of the second layer. The electrical insulator may comprise no more than about 50 wt. % of the first layer and no less than about 50 wt. % of the second layer. The electrical insulator may comprise no more than about 60 wt. % of the first layer and no less than about 40 wt. % of the second layer. The electrical insulator may comprise no more than about 70 wt. % of the first layer and no less than about 30 wt. % of the second layer. The electrical insulator may comprise no more than about 80 wt. % of the first layer and no less than about 20 wt. % of the second layer. The electrical insulator may comprise no more than about 90 wt. % of the first layer and no less than about 10 wt. % of the second layer.

In some embodiments, the electrical insulator comprises an electrically-insulating granular material and has a dielectric strength greater than about 1500 kV/m (40 V/mil).

The granular material may be a powder. The granular material may comprise a binder.

The electrical insulator may comprise a binding material.

The binding material may comprise a silicone, ceramic, glass powder, polymer or fluoropolymer.

The electrical insulator (e.g. the electrically-insulating granular material) may comprise no more than about 92 wt. % magnesium oxide, for example, no more than about 90 wt. % magnesium oxide, or no more than about 80 wt. % magnesium oxide, or no more than about 70 wt. % magnesium oxide, or no more than about 60 wt. % magnesium oxide, or no more than about 50 wt. % magnesium oxide, or no more than about 40 wt. % magnesium oxide, or no more than about 30 wt. % magnesium oxide, or no more than about 20 wt. % magnesium oxide, or no more than about 10 wt. % magnesium oxide, or no more than about 5 wt. % magnesium oxide. The electrical insulator (e.g. the electrically-insulating granular material) may be essentially free of magnesium oxide.

The electrically-insulating granular material may have a dielectric strength greater than about 1500 kV/m (about 40 V/mil).

The electrically-insulating granular material may be a first electrically-insulating granular material and the electrical insulator may further comprise a second electrically-insulating granular material different from the first electrically-insulating granular material. Accordingly, the first electrically-insulating granular material may have a dielectric strength greater than about 1500 kV/m (about 40 V/mil).

The electrically-insulating granular material (e.g. the first electrically-insulating granular material) may have a dielectric strength no less than about 1501 kV/m, for example, no less than about 6000 kV/m, or no less than about 7000 kV/m, or no less than about 7800 kV/m, or no less than about 10000 kV/m, or no less than about 15000 kV/m, or no less than about 20000 kV/m, or no less than about 23000 kV/m.

The electrically-insulating granular material (e.g. first electrically-insulating granular material) may have a dielectric strength no less than about 6000 kV/m, for example, no less than about 7000 kV/m, or no less than about 7800 kV/m, or no less than about 10000 kV/m, or no less than about 15000 kV/m, or no less than about 20000 kV/m, or no less than about 23000 kV/m.

The electrically-insulating granular material (e.g. the first electrically-insulating granular material) may have a dielectric strength no greater than about 10000000 kV/m, for example, no greater than about 500000 kV/m, or no greater than about 250000 kV/m, or no greater than about 1000000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically-insulating granular material (e.g. the first electrically-insulating granular material) may have a dielectric strength greater than about 1500 kV/m and no greater than about 10000000 kV/m, for example, greater than about 1500 kV/m and no greater than about 500000 kV/m, or greater than about 1500 kV/m and no greater than about 250000 kV/m, or greater than about 1500 kV/m and no greater than about 1000000 kV/m, or greater than about 1500 kV/m and no greater than about 50000 kV/m, or greater than about 1500 kV/m and no greater than about 40000 kV/m, or greater than about 1500 kV/m and no greater than about 39000 kV/m for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically-insulating granular material (e.g. the first electrically-insulating granular material) may have a dielectric strength no less than about 6000 kV/m and no greater than about 10000000 kV/m, for example, no less than about 6000 kV/m and no greater than about 500000 kV/m, or no less than about 6000 kV/m and no greater than about 250000 kV/m, or no less than about 6000 kV/m and no greater than about 1000000 kV/m, or no less than about 6000 kV/m and no greater than about 50000 kV/m, or no less than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically-insulating granular material (e.g. the first electrically-insulating granular material) may have a dielectric strength no less than about 7800 kV/m and no greater than about 10000000 kV/m, for example, no less than about 7800 kV/m and no greater than about 500000 kV/m, or no less than about 7800 kV/m and no greater than about 250000 kV/m, or no less than about 7800 kV/m and no greater than about 1000000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically-insulating granular material (e.g. the first electrically-insulating granular material) may have a dielectric strength no less than about 15000 kV/m and no greater than about 10000000 kV/m, for example, no less than about 15000 kV/m and no greater than about 500000 kV/m, or no less than about 15000 kV/m and no greater than about 250000 kV/m, or no less than about 15000 kV/m and no greater than about 1000000 kV/m, for example, no less than about 23000 kV/m and no greater than about 1000000 kV/m.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

The electrically-insulating granular material (e.g. the first electrically-insulating granular material) may comprise (e.g. be formed from, consist of or consist essentially of)one or more of: a metal oxide such as an alkaline earth metal oxide, for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate or phyllosilicate mineral such as mullite; or a glass ceramic such as a machinable glass ceramic. These materials may have a dielectric strength no less than about 7800 kV/m and no greater than about 39000 kV/m.

The electrically-insulating granular material (e.g. the first electrically-insulating granular material) may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic. These materials may have a dielectric strength no less than about 15000 kV/m and no greater than about 39000 kV/m.

The electrically-insulating granular material (e.g. the first electrically-insulating granular material) may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic. These materials may have a dielectric strength no less than about 23000 kV/m and no greater than about 39000 kV/m.

The electrically-insulating granular material (e.g. the first electrically-insulating granular material) may comprise (e.g. be formed from, consist of or consist essentially of) one or more materials having a melting point no less than about 1000° C., for example, no less than about 2000° C., or no less than about 3000° C. For example, one of the electrically-insulating granular materials may have a melting point no less than about 1000° C., for example, no less than about 2000° C., or no less than about 3000° C.

The electrically-insulating granular material (e.g. the first electrically-insulating granular material) may comprise (e.g. be formed from, consist of or consist essentially of) one or more of: a metal oxide such as an alkaline earth metal oxide, for example, magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite. These materials may have a melting point no less than about 1000° C.

The electrically-insulating granular material (e.g. the first electrically-insulating granular material) may comprise (e.g. be formed from, consist of or consist essentially of) one or more of: a metal oxide such as an alkaline earth metal oxide, for example, magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN). These materials may have a melting point no less than about 2000° C.

The electrically-insulating granular material (e.g. the first electrically-insulating granular material) may comprise (e.g. be formed from, consist of or consist essentially of) one or more of: a nitride such as a Group 13 nitride, for example, boron nitride (BN) This material may have a melting point no less than about 3000° C.

The electrically-insulating granular material (e.g. the first electrically-insulating granular material) may comprise (e.g. be formed from, consist of or consist essentially of) one or more materials having a thermal conductivity no less than about 3 W/mK, for example, no less than about 10 W/mK, or no less than about 100 W/mK. For example, the electrically-insulating granular material (e.g. the first electrically-insulating granular material) may have a thermal conductivity no less than about 3 W/mK, for example no less than about 10 W/mK, or no less than about 100 W/mK.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite. These materials may have a thermal conductivity no less than about 3 W/mK.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN). These materials may have a thermal conductivity no less than about 10 W/mK.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO) or a nitride such as a Group 13 nitride, for example, aluminium nitride (AlN). These materials may have a thermal conductivity no less than about 100 W/mK.

The electrically-insulating granular material (e.g. the first electrically-insulating granular material) may comprise (e.g. be formed from, consist of or consist essentially of) one or more materials having an electrical resistivity no less than about 100000 MΩm, for example, no less than about 1000000 MΩm, or no less than about 2000000 MΩm. For example, the electrically-insulating granular material (e.g. the first electrically-insulating granular material) may have an electrical resistivity no less than about 100000 MΩm, for example, no less than about 1000000 MΩm, or no less than about 2000000 MΩm.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 100000 MΩm.

The electrically-insulating granular material (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 1000000 MΩm.

The electrically-insulating granular material (e.g. the first electrically-insulating granular material) may comprise one or more of: a metal oxide such as an alkaline earth metal oxide, for example, magnesium oxide (MgO), a transition metal oxide, for example, hafnium dioxide ($HfO_2$); or a nitride such as a Group 13 nitride, for example, boron nitride (BN). These materials may have an electrical resistivity no less than about 2000000 MΩm.

The second electrically-insulating granular material may comprise one or more of: a metal oxide such as an alkaline earth metal oxide, for example, magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite. The second electrically-insulating granular material may be magnesium oxide (MgO). The second granular material may comprise from about 80 wt. % to about 100 wt. %, for example, from about 85 wt. % to about 95 wt. %, or about 92 wt. %, magnesium oxide (MgO).

The electrical insulator may comprise no more than about 92 wt. % magnesium oxide. The electrical insulator may comprise no more than about 90 wt. % magnesium oxide. The electrical insulator may comprise no more than about 80 wt. % magnesium oxide. The electrical insulator may comprise no more than about 70 wt. % magnesium oxide. The electrical insulator may comprise no more than about 60 wt. % magnesium oxide. The electrical insulator may comprise no more than about 50 wt. % magnesium oxide. The electrical insulator may comprise no more than about 40 wt. % magnesium oxide. The electrical insulator may comprise no more than about 30 wt. % magnesium oxide. The electrical insulator may comprise no more than about 20 wt. % magnesium oxide. The electrical insulator may comprise no more than about 10 wt. % magnesium oxide. The electrical insulator may comprise no more than about 5 wt. % magnesium oxide.

The electrical insulator may comprise no more than about 10 wt. % of the first electrically-insulating granular material and no less than about 90 wt. % of the second electrically insulating granular material. The electrical insulator may comprise no more than about 20 wt. % of the first electrically-insulating granular material and no less than about 80 wt. % of the second electrically insulating granular material. The electrical insulator may comprise no more than about 30 wt. % of the first electrically-insulating granular material and no less than about 70 wt. % of the second electrically insulating granular material. The electrical insulator may comprise no more than about 40 wt. % of the first electrically-insulating granular material and no less than about 60 wt. % of the second electrically insulating granular material. The electrical insulator may comprise no more than about 50 wt. % of the first electrically-insulating granular material and no less than about 50 wt. % of the second electrically insulating granular material. The electrical insulator may comprise no more than about 60 wt. % of the first electrically-insulating granular material and no less than about 40 wt. % of the second electrically insulating granular material. The electrical insulator may comprise no more than about 70 wt. % of the first electrically-insulating granular material and no less than about 30 wt. % of the second electrically insulating granular material. The electrical insulator may comprise no more than about 80 wt. % of the first electrically-insulating granular material and no less than about 20 wt. % of the second electrically insulating granular material. The electrical insulator may comprise no more than about 90 wt. % of the first electrically-insulating granular material and no less than about 10 wt. % of the second electrically insulating granular material.

The heating element unit may be for use in an electric resistance heater having a maximum operating temperature of (a) 450° C., (b) 300° C. or (c) 260° C. The heating element unit may be for use in an electric resistance heater having a maximum operating temperature of 1200° C.

The maximum operating temperature of an electric resistance heater is the maximum temperature of the casing of the heating element unit achieved during operation at the rated voltage.

There is also provided herein a method of manufacturing a heating element unit, the method comprising: providing the heating element within the casing; and providing the electrical insulator between the heating element and the casing.

Also provided herein is a use of one or more of the following in an electrical insulator provided between a heating element and a casing of a heating element unit for an electric resistance heater: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

Further provided herein is an electric resistance heater comprising a heating element unit.

For the avoidance of doubt, the invention extends to the subject-matter set out in the following numbered paragraphs.

1. A heating element unit for an electric resistance heater, the heating element unit comprising:

a casing;

a heating element within the casing; and an electrical insulator between the heating element and the casing;

wherein the electrical insulator comprises first and second layers, the second layer having a greater dielectric strength than the first layer, and the second layer having:

a dielectric strength of greater than about 1500 kV/m (greater than about 40 V/mil).

2. A heating element unit according to paragraph 1, wherein the second layer has a dielectric strength greater than about 1500 kV/m and no greater than about 39000 kV/m (greater than about 40 V/mil and no greater than about 1000 V/mil), for example, no less than about 7800 kV/m and no greater than about 39000 kV/m (no less than about 200 V/mil and no greater than about 1000 V/mil), or no less than about 15000 kV/m and no greater than about 39000 kV/m (no less than about 400 V/mil and no greater than about 1000 V/mil), or no less than about 23000 kV/m and no greater than about 39000 kV/m (no less than about 600 V/mil and no greater than about 1000 V/mil).

3. A heating element unit according to paragraph 1 or 2, wherein the second layer comprises one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

4. A heating element unit according to paragraph 3, wherein the second layer comprises one or more of: a metal oxide such as an alkaline earth metal oxide, for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate or phyllosilicate mineral such as mullite; or a glass ceramic such as a machinable glass ceramic.

5. A heating element unit according to paragraph 3, wherein the second layer comprises one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic.

6. A heating element unit according to paragraph 3, wherein the second layer comprises one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic.

7. A heating element unit according to any of paragraphs 1-3, wherein the second layer comprises one or more materials having a melting point no less than about 1000° C., for example, no less than about 2000° C., or no less than about 3000° C., for example wherein the second layer has a melting point no less than about 1000° C., or no less than about 2000° C., or no less than about 3000° C.

8. A heating element unit according to paragraph 7, wherein the second layer comprises one or more of: a metal oxide such as an alkaline earth metal oxide, for example, magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite.

9. A heating element unit according to paragraph 7, wherein the second layer comprises one or more of: a metal oxide such as an alkaline earth metal oxide, for example, magnesium oxide (MgO), a transition metal oxide, for example, zirconium dioxide (ZrO2), or hafnium dioxide (HfO2), or a post transition metal oxide, for example, aluminium oxide (Al2O3); or a nitride such as a Group 13 nitride, for example, boron nitride (BN) or aluminium nitride (AlN).

10. A heating element unit according to paragraph 7, wherein the second layer comprises one or more of: a nitride such as a Group 13 nitride, for example, boron nitride (BN).

11. A heating element unit according to any of paragraphs 1-3 or 7, wherein the second layer comprises one or more materials having a thermal conductivity no less than about 3 W/mK, for example, no less than about 10 W/mK, or no less than about 100 W/mK, for example, wherein the second layer has a thermal conductivity no less than about 3 W/mK, or no less than about 10 W/mK, or no less than about 100 W/mK.

12. A heating element unit according to paragraph 11, wherein the second layer comprises one or more of: a metal oxide such as an alkaline earth metal oxide, for example, beryllium oxide (BeO) or magnesium oxide (MgO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite.

13. A heating element unit according to paragraph 11, wherein the second layer comprises one or more of: a metal oxide such as an alkaline earth metal oxide, for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN).

14. A heating element unit according to paragraph 11, wherein the second layer comprises a metal oxide such as an alkaline earth metal oxide, for example, beryllium oxide (BeO) or a nitride such as a Group 13 nitride, for example, aluminium nitride (AlN).

15. A heating element unit according to any of paragraphs 1-3, 7 or 11, wherein the second layer comprises one or more materials having an electrical resistivity no less than about 100000 MΩm, for example, no less than about 1000000 MΩm, or no less than about 2000000 MΩm, for example, wherein the second layer has an electrical resistivity no less than about 100000 MΩm, or no less than about 1000000 MΩm, or no less than about 2000000 MΩm.

16. A heating element unit according to paragraph 15, wherein the second layer comprises one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

17. A heating element unit according to paragraph 15, wherein the second layer comprises one or more of: a metal oxide such as an alkaline earth metal oxide, for example, beryllium oxide (BeO) or magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

18. A heating element unit according to paragraph 15, wherein the second layer comprises one or more of: a metal oxide such as an alkaline earth metal oxide, for example, magnesium oxide (MgO), a transition metal oxide, for example, hafnium dioxide ($HfO_2$); or a nitride such as a Group 13 nitride, for example, boron nitride (BN).

19. A heating element unit according to any preceding paragraph, wherein the first layer comprises one or more of: a metal oxide such as an alkaline earth metal oxide, for example, magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite.

20. A heating element unit according to any preceding paragraph wherein the first layer has a dielectric strength of no greater than about 9800 kV/m (250 V/mil).

21. A heating element unit according to any preceding paragraph, wherein the first layer is an inner layer and the second layer is an outer layer, or the first layer is an outer layer and the second layer is an inner layer.

22. A heating element unit according to any preceding paragraph, wherein the second layer is a sleeve, for example, a preformed sleeve.

23. A heating element unit according to paragraph 22, wherein the sleeve comprises one or more of: a silicate, aluminium silicate, aluminosilicate or phyllosilicate mineral such as mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

24. A heating element unit according to paragraph 22, wherein the sleeve comprises a polymeric material.

25. A heating element unit according to any of paragraphs 1-21, wherein the second layer is a coating, for example, a coating on the casing.

26. A heating element unit according to paragraph 25, wherein the coating is a ceramic-based coating or a polymer-based coating such as a silicone-based coating or a fluoropolymer-based coating.

27. A heating element unit for an electric resistance heater, the heating element unit comprising:

a casing;

a heating element within the casing; and an electrical insulator between the heating element and the casing;

wherein the electrical insulator comprises an electrically-insulating granular material and has a dielectric strength greater than about 1500 kV/m (greater than about 40 V/mil).

28. A heating element unit according to paragraph 27, wherein the electrically-insulating granular material is a first electrically-insulating granular material and the electrical insulator further comprises a second electrically-insulating granular material different from the first electrically-insulating granular material.

29. A heating element unit according to paragraph 28, wherein the second electrically-insulating granular material is magnesium oxide (MgO).

30. A heating element unit according to any of paragraphs 27-29, wherein the electrically-insulating granular material has a dielectric strength greater than about 1500 kV/m (40 V/mil).

31. A heating element unit according to any of paragraphs 27-30, wherein the electrically-insulating granular material has a dielectric strength greater than about 1500 kV/m and no greater than about 39000 kV/m (greater than about 40 V/mil and no greater than about 1000 V/mil), for example, no less than about 7800 kV/m and no greater than about 39000 kV/m (no less than about 200 V/mil and no greater than about 1000 V/mil), or no less than about 15000 kV/m and no greater than about 39000 kV/m (no less than about 400 V/mil and no greater than about 1000 V/mil), or no less than about 23000 kV/m and no greater than about 39000 kV/m (no less than about 600 V/mil and no greater than about 1000 V/mil).

32. A heating element unit according to any of paragraphs 27-31, wherein the electrically-insulating granular material comprises one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

33. A heating element unit according to paragraph 32, wherein the electrically-insulating granular material comprises one or more of: a metal oxide such as an alkaline earth metal oxide, for example, beryllium oxide (BeO), a transition metal oxide, for example, zirconium dioxide ($ZrO_2$), or hafnium dioxide ($HfO_2$), or a post transition metal oxide, for example, aluminium oxide (Al2O3); a nitride such as a Group 13 nitride, for example, boron nitride (BN) or aluminium nitride (AlN), or a Group 14 nitride, for example, silicon nitride (SiN); a silicate or phyllosilicate mineral such as mullite; or a glass ceramic such as a machinable glass ceramic.

34. A heating element unit according to paragraph 32, wherein the electrically-insulating granular material comprises one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic.

35. A heating element unit according to paragraph 32, wherein the electrically-insulating granular material comprises one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic.

36. A heating element unit according to any of paragraphs 27-32, wherein the electrically-insulating granular material comprises one or more materials having a melting point no less than about 1000° C., for example, no less than about 2000° C., or no less than about 3000° C.

37. A heating element unit according to paragraph 36, wherein the electrically-insulating granular material comprises one or more of: a metal oxide such as a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite.

38. A heating element unit according to paragraph 36, wherein the electrically-insulating granular material comprises one or more of: a metal oxide such as a transition metal oxide, for example, zirconium dioxide ($ZrO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN).

39. A heating element unit according to paragraph 36, wherein the electrically-insulating granular material comprises a nitride such as a Group 13 nitride, for example, boron nitride (BN).

40. A heating element unit according to any of paragraphs 27-32 or 36, wherein the electrically-insulating granular material comprises one or more materials having a thermal conductivity no less than about 3 W/mK, for example, no less than about 10 W/mK, or no less than about 100 W/mK, for example, wherein the electrically-insulating granular material has a thermal conductivity no less than about 3 W/mK, or no less than about 10 W/mK, or no less than about 100 W/mK.

41. A heating element unit according to paragraph 40, wherein the electrically-insulating granular material comprises one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite.

42. A heating element unit according to paragraph 40, wherein the electrically-insulating granular material comprises one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN).

43. A heating element unit according to paragraph 40, wherein the electrically-insulating granular material comprises a metal oxide such as an alkaline earth metal oxide, for example, beryllium oxide (BeO) or a nitride such as a Group 13 nitride, for example, aluminium nitride (AlN).

44. A heating element unit according to any of paragraphs 27-32, 36 or 40, wherein the electrically-insulating granular material comprises one or more materials having an electrical resistivity no less than about 100000 MΩm, for example, no less than about 1000000 MΩm, or no less than about 2000000 MΩm, for example, wherein the electrically-insulating granular material has an electrical resistivity no less than about 100000 MΩm, or no less than about 1000000 MΩm, or no less than about 2000000 MΩm.

45. A heating element unit according to paragraph 44, wherein the electrically-insulating granular material comprises one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

46. A heating element unit according to paragraph 44, wherein the electrically-insulating granular material comprises one or more of: a metal oxide such as an alkaline earth metal oxide other than magnesium oxide (MgO), for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

47. A heating element unit according to paragraph 44, wherein the electrically-insulating granular material comprises one or more of: a metal oxide such as a transition metal oxide, for example, hafnium dioxide ($HfO_2$); or a nitride such as a Group 13 nitride, for example, boron nitride (BN).

48. A heating element unit according to paragraph 44, wherein the electrically-insulating granular material comprises one or more of: a metal oxide such as a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite.

49. A heating element unit according to any of paragraphs 27-48, wherein the electrical insulator comprises a binding material.

50. A heating element unit according to paragraph 49, wherein the binding material comprises a polymer such as a silicone, a hydrocarbon based polymer or a fluoropolymer, a ceramic, a glass powder, or a mineral.

51. A heating element unit according to any preceding paragraph, for use in an electric resistance heater having a maximum operating temperature of (a) 450° C., (b) 300° C. or (c) 260° C.

52. An electric resistance heater comprising a heating element unit according to any preceding paragraph.

53. A method of manufacturing a heating element unit according to any of paragraphs 1 to 51, the method comprising: providing the heating element within the casing; and providing the electrical insulator between the heating element and the casing.

54. Use of one or more of the following in an electrical insulator provided between a heating element and a casing of a heating element unit for an electric resistance heater: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

FIGURES

Figure 2C:
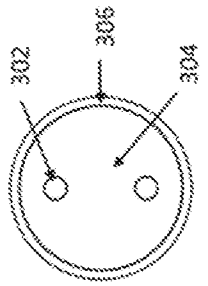
Figure 2A:
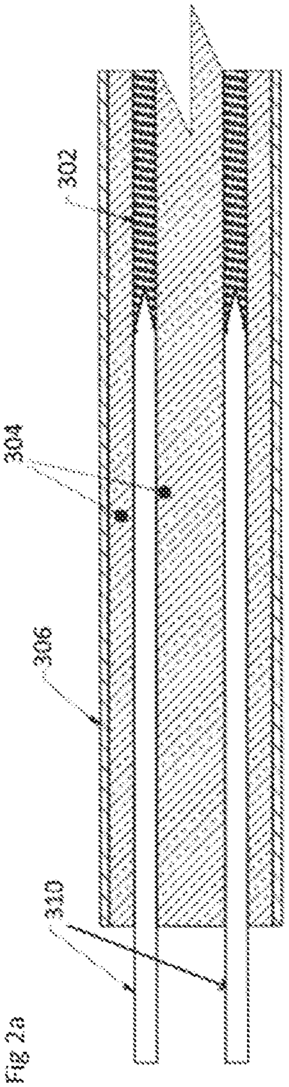
Figure 2B:
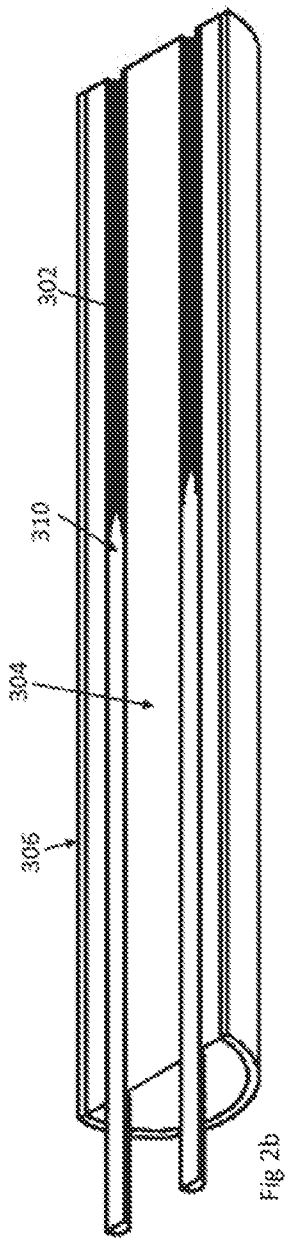
Figure 3A:
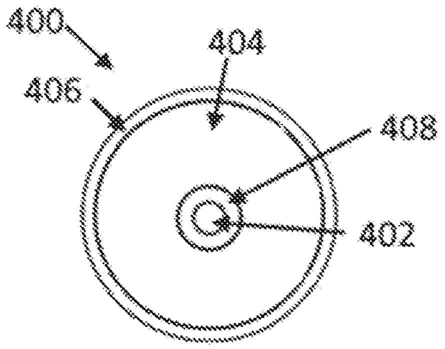
Figure 3B:
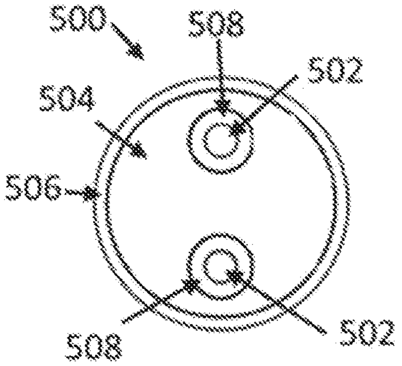
Figure 3C:
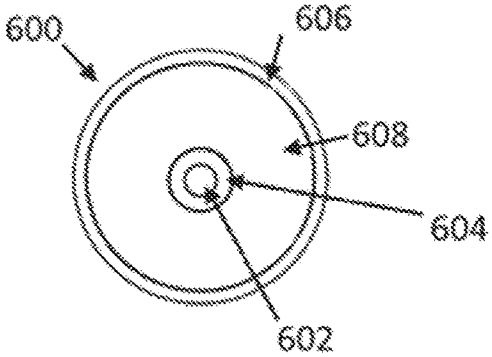
Figure 3D:
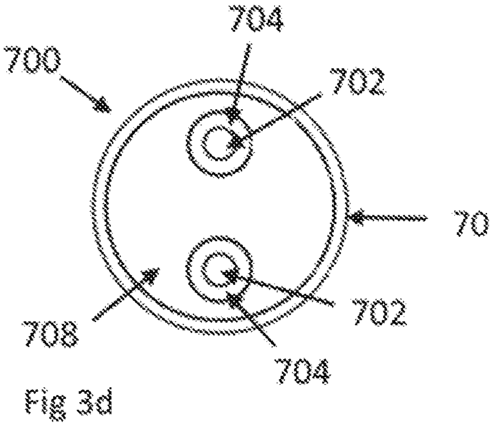
Figure 4:
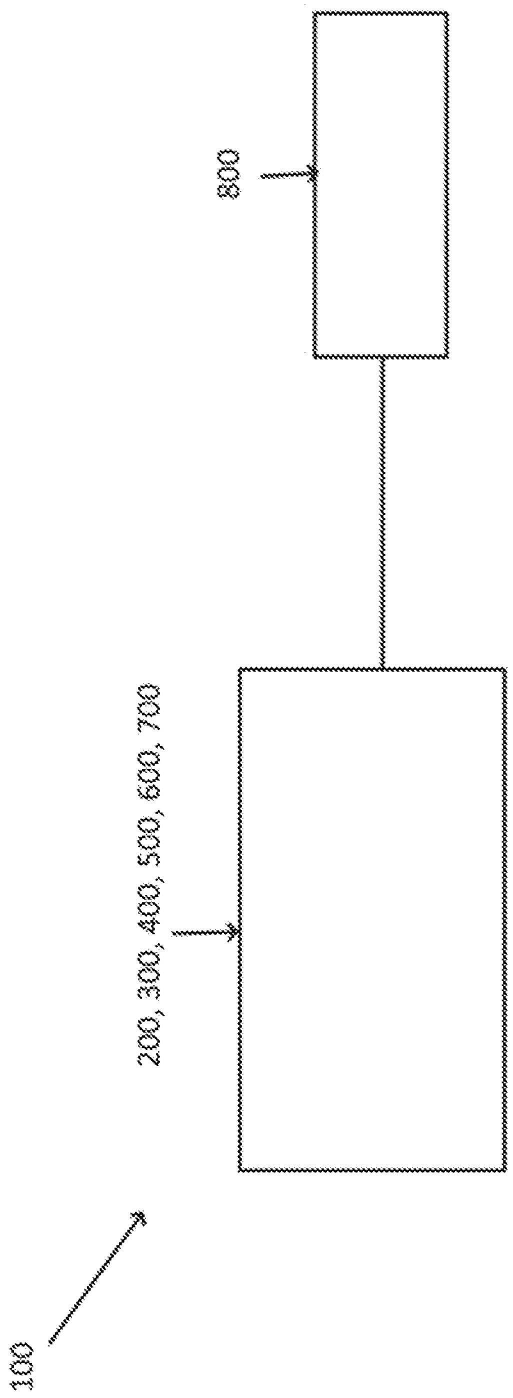

Embodiments will now be described by way of example only, with reference to the Figures, in which:

FIGS. 1*a*-1*c* are cross sectional views of a first example heating element unit;

FIGS. 2*a*-2*c* are cross sectional views of a second example heating element unit;

FIGS. 3*a*-3*d* are cross sectional views of four additional examples of heating element units; and FIG. 4 is a schematic diagram of an electrical resistance heater.

DETAILED DESCRIPTION OF THE INVENTION

FIGS. 1*a*-1*c* show a first example heating element unit 200 which comprises a heating element 202, a first insulator layer 204, a second insulator layer 208, a casing 206, and two terminal pins 210. The casing 206 is substantially cylindrical and is in the form of a tubular sheath which surrounds the heating element 202, and the first and second insulator layers 204, 208.

The heating element 202 is in the form of a coil which extends within the casing 206. A first coil portion 212 extends in a substantially straight line, and curves around 180° (not shown) before passing back on itself within the casing, forming a second coil portion 214 which is substantially straight and substantially parallel to the first coil portion 212. The first and second coil portions 212, 214 are spaced apart by a distance D.

Each of the first and second coil portions 212, 214 of the heating element 202 are connected to a terminal, or electrical supply, pin 210. The terminal pins 210 are located mostly within the casing 206, and each comprises a respective end portion 216 which extends beyond the casing for connection to a power supply (not shown), so as to allow the application of a voltage to the end portions 216 of the terminal pins.

Around each of the first and second coil portions 212, 214, there is provided a first layer 204 of a thermally conducting electrical insulator. In this example, the first layer 204 of insulator is a powder comprising about 92 wt. % magnesium oxide (the remainder of the powder being made up, for example, of other oxides such as silica, calcium oxide, alumina and iron oxide, and impurities). In this example, the first layer 204 of insulator has an electrical resistivity of about $2\times10^6$ MΩm (about $8\times10^7$ MΩ·in) at ambient temperature, a dielectric strength of about 1500 kV/m (about 40 V/mil), and a thermal conductivity of about 5.2 W/mK. In other examples, the powder comprises alternative thermally conducting, electrically insulating materials such as beryllium oxide, titanium dioxide, zirconium dioxide, hafnium dioxide, aluminium oxide, boron nitride, aluminium nitride, silicon nitride, mullite or mica. In yet further examples, a prefilled ceramic, such as a prefilled MgO ceramic, may be used.

Within the casing 206, there is also provided a second layer of insulator 208 in the form of a sleeve which is formed to fit around the heating element 202 and the terminal pins 210. The sleeve 208 is a preformed sleeve. The sleeve 208 may be formed of, for example, a thermally conducting, electrically insulating polymer such as a silicone, hydrocarbon-based polymer or fluoropolymer (e.g., FEP/PTFE/PFA), a ceramic, glass, a glass ceramic, and/or a mineral such as mica, depending upon the desired application. In this example, the sleeve is formed of FEP/PTFE.

In other embodiments, the sleeve 208 is replaced by a coating 208, which is formed on the heating element 202 by, for example, spraying or painting. In other arrangements, the sleeve or coating 208 may be formed to fit or to be applied on the inside of the casing 206. The coating may be ceramic-based (e.g. formed from ceramic-based materials such as Cerakote® coatings available from NIC Industries, Inc., USA, Duracote® coatings available from Duracote Corporation, USA, CeraGlide® coatings available from Saint Gobain Ceramics, France, or Aluma-Hyde® coatings available from Brownells, Inc., USA), and/or polymer-based (e.g. silicone based, hydrocarbon-based polymer based or fluoropolymer based) depending upon the desired application. In this example, the coating is formed with Cerakote®.

The second layer of insulator 208 comprises a material having a dielectric strength greater than about 1500 kV/m (about 40 V/mil). In one example, the second layer comprises powdered boron nitride, having an electrical resistivity of about $2.5\times10^{6}$ MΩm (about $9.85\times10^{7}$ MΩ·in) at ambient temperature, a dielectric strength of about 37500 kV/m (about 950 V/mil), and a thermal conductivity of about 30 W/mK. It will be appreciated that, in other embodiments, other materials having a dielectric strength greater than about 1500 kV/m (about 40 V/mil) may be used as the second layer. In yet further embodiments, the second layer of insulator 208 comprises a material having a dielectric strength greater than the dielectric strength of the material from which the first layer of insulator 204 is formed.

By using a second layer 208 of insulator which comprises a material having a dielectric strength which is (a) greater than 1500 kV/m (about 40 V/mil) where the first layer 204 of insulator comprises MgO, or more generally (b) greater than the dielectric strength of the material from which the first layer of insulator 204 is formed, the dielectric strength of the insulator (i.e., the first and second layers combined) is increased.

The heating element 202 is formed from a material having high electrical resistivity, for example, no less than about 0.90 $\Omega mm^2/m$ (540 Ω/cmf) and no greater than about 1.60 $\Omega mm^2/m$ (960 Ω/cmf). In the example, the heating element 102 is formed from a nichrome alloy, such as Nikrothal® 80 available from Kanthal AB, Sweden and has an electrical resistivity of about 1.09 $\Omega mm^2/m$ (654 Ω/cmf).

In use, a voltage is applied across the terminal pins 210, which causes the flow of current through the heating element 202. As current passes through the heating element, the heating element 202 heats up due to its high electrical resistance. The heat is passed to the casing (and the surroundings) via the insulator which has good thermally conducting properties. The insulator is electrically insulating and has a high dielectric strength (i.e., a high dielectric breakdown strength), which inhibits the flow of current from the heating element 202 to the casing 206. By using an insulator having an increased dielectric strength, higher voltages may be achieved without a concomitant increase in the amount of insulator required or the size of the heating element, such that the process of transferring heat to the surroundings is rendered more efficient.

Alternative arrangements of the heating element unit are shown in cross section in FIGS. 2*a*-2*c*, and in FIG. 3*a*-3*d*. In these arrangements, features corresponding to those previously described in relation to FIG. 1 are indicated with like reference numerals, increased in increments of 100. For instance, the heating element 300 of FIG. 2*a*-2*c* comprises a casing 306 and a heating element 302, and the heating elements 400, 500, 600 and 700 of FIGS. 3*a*-3*d* comprise respective casings 406, 506, 606, 706 and heating elements 402, 502, 602, 702.

The differences between the heating element unit 300 of FIGS. 2*a*-2*c* and the heating element unit 200 will now be described. In FIGS. 2*a*-2*c*, the dielectric strength of the insulator is improved by the combination of at least two different electrically insulating granular materials within the casing. The improvement in dielectric properties is provided by the use of a combination of different powdered materials intimately mixed with one another. In this example, the insulator comprises a mix of powdered magnesium oxide and powdered boron nitride. In this example, the magnesium oxide powder has an electrical resistivity of about $2\times10^{6}$ MΩm (about $8\times10^{7}$ MΩ·in) at ambient temperature, a dielectric strength of about 1500 kV/m (about 40 V/mil), and a thermal conductivity of about 5.2 W/m·K. In this example, the boron nitrite powder has an electrical resistivity of about 2.5×106 MΩm (about 9.85×107 MΩ·in) at ambient temperature, a dielectric strength of about 37500 kV/m (about 950 V/mil), and a thermal conductivity of about 30 W/m·K. As a result, the insulator (i.e. the combination of the powders, has a dielectric strength greater than about 1500 kV/m (about 40 V/mil).

In other examples, other combinations of powdered materials may be used to result in an insulator having a dielectric strength greater than about 1500 kV/m (about 40 V/mil). The proportions of the different powdered materials used may be varied to target desired levels of electrical resistivity, dielectric strength and/or thermal conductivity, as well as other physical or chemical properties. In some examples, ceramic binding materials may also be used.

FIGS. 3*a*-3*d* show various different arrangements of heating element units in cross-section. In the heating element unit 400 of FIG. 3*a*, there is a single heating element 402 provided, which is surrounded by a second layer of insulator 408 which is in turn surrounded by a first layer of insulator 404 and encased within a sheath 406. As described in relation to FIG. 1 above, the second layer of insulator 408 has a higher dielectric strength than that of the first layer of insulator 404. It will be appreciated that the second layer of insulator 408 may be a sleeve or coating as described in relation to FIG. 1 above.

FIG. 3*b* shows a heating element unit 500 comprising two heating element portions 502, each of which is surrounded by a second layer of insulator 508. A first layer of insulator 504 surrounds both of the heating element portions 502 and second layers of insulator 508, and is encased within a sheath 506. As described in relation to FIG. 1 above, the second layer of insulator 508 has a higher dielectric strength than that of the first layer of insulator 504. It will be appreciated that the second layer of insulator 508 may be a sleeve or coating as described in relation to FIG. 1 above.

FIGS. 3*c* and 3*d* show heating element units 600 and 700 respectively. The heating element unit 600 is substantially corresponding to that of FIG. 3*a*, however the order of the first and second layers of insulator 604, 608 have been swapped so that the second layer of insulator 608 is the outermost layer, with the first layer 604 being the inner layer. Similarly, the heating element unit 700 is substantially corresponding to that of FIG. 3*b*, however the order of the first and second layers of insulator 704, 708 have been swapped so that the second layer of insulator 708 is the outermost layer, with the first layer 704 being the inner layer surrounding each of the two heating elements 704.

It will be appreciated by the skilled person that the layer thicknesses of the first and second layers of insulator may be varied, to adapt the dielectric properties as desired.

It will be understood that a heating element unit may include a combination of the sleeve or coating of FIGS. 1*a-c* or FIGS. 3*a*-3*d* and a combination of at least two different electrically insulating granular materials within the first and/or second insulator layers, as described in relation to FIGS. 2*a*-2*c*. Moreover, in embodiments such as shown in FIGS. 3*b* and 3*d*, both sets of heating element portions 502 and 702 could be surrounded by the same, single second layer of insulator 508 or 708.

As shown in FIG. 4, there is provided an electrical resistance heater 400. The electrical resistance heater comprises any of the heating element units 100, 200, 300 as described above, connected to an electrical power supply 500.

The invention claimed is:

1. A heating element unit for an electric resistance heater, the heating element unit comprising: a casing; a heating element within the casing; and an electrical insulator between the heating element and the casing, wherein the electrical insulator is a non-metallic electrical insulator; wherein the electrical insulator comprises first and second layers, the second layer having a greater dielectric strength than the first layer, and the second layer having: a dielectric strength of greater than 1500 kV/m (greater than 40 V/mil); wherein the first layer is an inner layer and the second layer is an outer layer, or the first layer is an outer layer and the second layer is an inner layer; and wherein the inner layer is arranged radially inwards of the outer layer such that the outer layer surrounds the inner layer.

2. A heating element unit according to claim 1, wherein the second layer has a dielectric strength no less than 7800 kV/m and no greater than 39000 kV/m (no less than 200 V/mil and no greater than 1000 V/mil).

3. A heating element unit according to claim 1, wherein the second layer comprises one or more of: a metal oxide; a nitride; a silicate, aluminium silicate, aluminosilicate or phyllosilicate mineral; a glass; a ceramic; a glass ceramic; a polymer.

4. A heating element unit according to claim 1 wherein the first layer has a dielectric strength of no greater than 9800 kV/m (250 V/mil).

5. A heating element unit according to claim 1, wherein the second layer is a sleeve.

6. A heating element unit according to claim 5, wherein the sleeve comprises one or more of: a silicate, aluminium silicate, aluminosilicate or phyllosilicate mineral; a glass; a ceramic; a glass ceramic; a polymer.

7. A heating element unit according to claim 1, wherein the second layer is a coating on the heating element or on the casing.

8. A heating element unit according to claim 7, wherein the coating is a ceramic-based coating or a polymer-based coating.

9. A heating element unit according to claim 1, for use in an electric resistance heater having a maximum operating temperature of 1200° C.

10. An electric resistance heater comprising a heating element unit, the heating element unit comprising:

a casing;

a heating element within the casing; and an electrical insulator between the heating element and the casing, wherein the electrical insulator is a non-metallic electrical insulator;

wherein the electrical insulator comprises:

first and second layers, the second layer having a greater dielectric strength than the first layer, and the second layer having a dielectric strength of greater than 1500 kV/m (greater than 40 V/mil);

wherein the first layer is an inner layer and the second layer is an outer layer, or the first layer is an outer layer and the second layer is an inner layer; and wherein the inner layer is arranged radially inwards of the outer layer such that the outer layer surrounds the inner layer.

* * * * *